(12) United States Patent
Khazan et al.

(10) Patent No.: US 10,341,302 B2
(45) Date of Patent: Jul. 2, 2019

(54) OPTIMIZED TRANSPORT LAYER SECURITY

(71) Applicants: Roger I. Khazan, Arlington, MA (US); Daniil M. Utin, Waban, MA (US)

(72) Inventors: Roger I. Khazan, Arlington, MA (US); Daniil M. Utin, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 43 days.

(21) Appl. No.: 15/148,327

(22) Filed: May 6, 2016

(65) Prior Publication Data

US 2017/0019381 A1    Jan. 19, 2017

Related U.S. Application Data (63) Continuation of application No. 13/919,596, filed on Jun. 17, 2013, now Pat. No. 9,344,405.

(Continued)

(51) Int. Cl.
*H04L 29/06*    (2006.01)
*H04W 12/02*    (2009.01)
(Continued)

(52) U.S. Cl.
CPC ............ *H04L 63/0428* (2013.01); *H04L 9/14* (2013.01); *H04L 9/30* (2013.01); *H04L 9/3263* (2013.01);
(Continued)

(58) Field of Classification Search
CPC .... H04L 63/0884; H04L 63/205; G06F 21/30
(Continued)

(56) References Cited

U.S. PATENT DOCUMENTS 7,073,066 B1    7/2006 Nessett
7,249,377 B1    7/2007 Lita
(Continued)

OTHER PUBLICATIONS

Gupta V., "Experiments in Wireless Internet Security," Mar. 2002, IEEE, vol. 2, pp. 860-864.

(Continued)

*Primary Examiner* — Shin-Hon (Eric) Chen
*Assistant Examiner* — Viral S Lakhia
(74) *Attorney, Agent, or Firm* — Occhiuti & Rohlicek LLP (57) ABSTRACT

A method for establishing a secure communication session over communication paths between one or more client devices and one or more server computers according to a communication protocol includes initiating the session including passing communication through a proxy on a device on the communication paths, passing session initiation information between the client devices and the server computers via the proxy, passing encrypted content between the client devices and the server computers over secure communication sessions, each established for exclusive access from one client device and one server computer based on the exchanged session initiation information between said client device and said server computer whereby the proxy does not have access to the content, and modifying, using the proxy, at least some information passing between a client device and a server computer such that the communication to and from the server computer adheres to the communication protocol.

20 Claims, 3 Drawing Sheets

Related U.S. Application Data (60) Provisional application No. 61/660,036, filed on Jun. 15, 2012.

(51) Int. Cl.
  H04L 9/14 (2006.01)
  H04L 9/30 (2006.01)
  H04L 9/32 (2006.01)
  H04W 12/04 (2009.01)
  H04W 12/06 (2009.01)
  H04L 29/08 (2006.01)
  H04W 76/12 (2018.01)

(52) U.S. Cl.
  CPC ........ *H04L 63/0281* (2013.01); *H04L 63/061* (2013.01); *H04L 63/0823* (2013.01); *H04L 63/166* (2013.01); *H04W 12/02* (2013.01); *H04W 12/04* (2013.01); *H04W 12/06* (2013.01); *H04L 67/2876* (2013.01); *H04L 69/04* (2013.01); *H04L 2209/80* (2013.01); *H04W 76/12* (2018.02)

(58) Field of Classification Search
  USPC .............................. 726/12–14; 713/151–153
  See application file for complete search history.

(56) References Cited

U.S. PATENT DOCUMENTS

| | | | | |
|---|---|---|---|---|
| 7,965,701 B1* | 6/2011 | Toennis | ............ | H04L 63/0428 370/352 |
| 8,051,181 B2 | 11/2011 | Larson | | |
| 8,111,620 B1* | 2/2012 | Swan | .............. | H04L 12/2861 370/230 |
| 8,184,530 B1* | 5/2012 | Swan | .............. | H04W 76/12 370/230 |
| 8,327,128 B1* | 12/2012 | Prince | ............. | H04L 63/0823 713/150 |
| 8,478,986 B2 | 7/2013 | Merugu et al. | | |
| 8,700,892 B2* | 4/2014 | Bollay | ............. | H04L 63/166 713/153 |
| 8,782,393 B1* | 7/2014 | Rothstein | ........ | H04L 63/0281 705/75 |
| 2002/0035681 A1* | 3/2002 | Maturana | ......... | H04L 63/0428 713/151 |
| 2002/0141389 A1 | 10/2002 | Fangman et al. | | |
| 2006/0101510 A1* | 5/2006 | Kadyk | ............ | H04L 63/0281 726/12 |
| 2006/0209789 A1 | 9/2006 | Gupta et al. | | |
| 2006/0274899 A1* | 12/2006 | Zhu | ................ | H04L 9/083 380/281 |
| 2007/0038853 A1* | 2/2007 | Day | ................ | H04L 63/0281 713/153 |
| 2007/0101122 A1* | 5/2007 | Guo | ................ | H04L 63/061 713/153 |
| 2007/0245414 A1* | 10/2007 | Chan | .............. | H04L 63/0823 726/12 |
| 2009/0083537 A1* | 3/2009 | Larsen | ............ | H04L 63/0281 713/153 |
| 2009/0083538 A1* | 3/2009 | Merugu | .......... | H04L 63/0281 713/153 |
| 2010/0299525 A1* | 11/2010 | Shah | .............. | H04L 63/0428 713/171 |
| 2011/0093710 A1* | 4/2011 | Galvin | ............ | H04L 63/061 713/169 |
| 2011/0231655 A1* | 9/2011 | Bollay | ............ | H04L 63/166 713/153 |
| 2011/0264905 A1* | 10/2011 | Ovsiannikov | ..... | H04L 29/08792 713/151 |
| 2011/0289311 A1* | 11/2011 | Roy-Chowdhury | ........ | H04L 9/0844 713/151 |
| 2012/0002813 A1* | 1/2012 | Wei | ................ | H04L 63/0272 380/270 |
| 2012/0042160 A1* | 2/2012 | Nakhjiri | ........ | H04L 9/0844 713/151 |
| 2013/0283041 A1 | 10/2013 | Vajirkar et al. | | |
| 2013/0305036 A1* | 11/2013 | Vos | ................ | H04L 63/166 713/151 |
| 2013/0305392 A1 | 11/2013 | Bar-el et al. | | |
| 2014/0298415 A1 | 10/2014 | Xie et al. | | |
| 2014/0337614 A1* | 11/2014 | Kelson | .......... | H04L 63/168 713/152 |

OTHER PUBLICATIONS

Langley et al., "Transport Layer Security (TLS) False Start," Jun. 2, 2010.
McVeety et al., "Secure Channel Establishment in Disadvantaged Networks: TLS Optimization Using Intercepting Proxies," Information Systems Technology Group, MIT Lincoln Laboratory, Aug. 18, 2009.
Shacham et al., "Client Side Caching for TLS," NDSS (2002).

* cited by examiner

OPTIMIZED TRANSPORT LAYER SECURITY

CROSS-REFERENCE TO RELATED APPLICATIONS

This application is a continuation of U.S. application Ser. No. 13/919,596, filed on Jun. 17, 2013 and to be issued on May 17, 2016 as U.S. Pat. No. 9,344,405 which claims the benefit of U.S. Provisional Application No. 61/660,036 filed Jun. 15, 2012 the contents of which are hereby incorporated by reference in their entirety.

STATEMENT AS TO FEDERALLY SPONSORED RESEARCH

This invention was made with government support under Contract No. FA8721-05-C-0002, Program No. 1488 awarded by the Air Force Cryptographic Modernization Program Office (AF CMPO). The government has certain rights in the invention.

BACKGROUND

This invention relates to an optimized transport layer security scheme for establishing a secure network connection.

Conventional security schemes exist to allow client-server applications to communicate over a network connection while preventing unauthorized or malicious entities from eavesdropping on the communication.

The most commonly used conventional security schemes are transport layer security (TLS) and its predecessor, secure socket layer (SSL). Both schemes are cryptographic protocols which utilize asymmetric cryptography (e.g., public key cryptography) to establish a shared session key between the client and the server. This key is subsequently used as a symmetric key for securely transmitting messages between the client and the server.

Various attempts have been made to accelerate the handshake process of TLS and SSL. However, most of these attempts either required modifications to be made to TLS/SSL servers or were found to be incompatible with some configurations of TLS/SSL servers.

SUMMARY

In one aspect, in general, a method for establishing a secure communication session over communication paths between one or more client devices and one or more server computers according to a communication protocol involves passing communication through a proxy (e.g., either a sole proxy or one of a number of proxies) implemented on a device on the communication paths. The proxy passes session initiation information between the one or more client devices and the one or more server computers. The proxy also passes encrypted content between the one or more client device and the one or more server computer over secure communication sessions each established for exclusive access from one client device and one server computer based on the exchanged session initiation information between said client device and said server computer, whereby the proxy does not have access to the content. The proxy modifies at least some information passing between a client device and a server computer such that the communication to and from the server computer adheres to the communication protocol.

Aspects may include one or more of the following features.

The communication protocol comprises a Transport Layer Security (TLS) protocol.

The proxy modifies timing of at least some information passing from the client device to the server computer.

Passing encrypted content between the client device and the server computer over the secure communication session includes accepting a message from the client at the proxy prior to the proxy receiving an indication from the server computer that the server computer is ready to securely communicate over said session.

Passing encrypted content between the client device and the server computer over the secure communication session further includes delaying forwarding of the message to the server computer until the proxy has received the indication from the server computer that the server computer is ready to securely communicate over said session.

The proxy communicates with the client devices over relatively disadvantaged communication links compared to the links between the proxy and the server computers. In some examples, the disadvantages communication links exhibit substantially higher latency than the links between the proxy and the server computers.

Passing session initiation information between the client device and the server computer includes receiving a command to establish the secure communication session from the client device at the proxy, and transmitting a corresponding command from the proxy to the server computer.

Establishing the secure connection includes the client device and the server computer communicating according to a secure protocol including a plurality of allowable protocol states, and wherein the proxy modifying timing of messages carrying the session initiation information includes maintaining the client device and the server computer at inconsistent protocol states, while maintaining apparently mutual consistency of protocol states for the client device and the server computer from their individual points of views.

Passing the session initiation information further includes modifying content of the messages carrying the session initiation information.

An amount of data passed between the proxy and a client device is substantially smaller than a corresponding amount of data passed between the proxy and a server computer in establishing the session between the client device and the server computer.

Passing the session initiation information further includes receiving cryptographic data, for instance including a cryptographic certificate, from the server computer in a first message, and sending a second message to the client with a reference to said data accessible at the client device (e.g., without communication over a disadvantaged link). In some examples, reference to the data is determined from one or more characteristics of cryptographic data for the server computer provided by the client device to the proxy. In some such examples, these characteristics are provided in a message from the client for initiating the establishing of the session.

The proxy modifies content of at least some messages carrying information for establishing the secure session between a client device and a server computer, and modifies timing but not content of at least some encrypted content passing between the client device and the server computer.

The proxy passes communication according to the communication protocol between other client devices and the server computers without modification.

The proxy is hosted on a device separate from the client devices and the server computers. Alternatively, the proxy is hosted at one of the server computers.

In another aspect, in general, a proxy is implemented in a network device for communication with client devices and server computers over data networks and is configured to perform all the steps of the any of the methods set forth above.

In another aspect, in general, software tangibly embodied on a non-transitory computer-readable medium includes instructions for causing a data processing system to perform all the steps of the any of the methods set forth above.

In another aspect, in general, a method for establishing a secure communication session between a client device and a server computer includes initiating the secure communication session by sending a communication from the client device to the server computer via a proxy system on a communication path between the client device and the server computer. This includes causing an interchange between the proxy system and the server computer to exchange session initiation information according to a communication protocol. The client device communicates interchanges information with the proxy system according to a protocol that differs from the communication protocol used between the proxy system and the server computer in content and/or timing of messages. In some examples, a software interface is provided at the client device for communicating with the server computer according to the communication protocol.

Aspects may include one or more of the following features.

The client device exchanges encrypted content with the server computer via the proxy system without disclosing the content to the proxy system or providing a means for the proxy system to decrypt the encrypted content.

In another aspect, in general, a computer-implemented client for securely communicating with server computer according to a first communication protocol includes a first part that is hosted on a client device, and a second part that is hosted on a proxy separated from the client device by a communication link. The first part and the second part are configured to use a second communication protocol different from the first communication protocol in message content and/or timing.

Aspects may include one or more of the following features.

The first part of the client is configured to provide a software interface to applications on the client device according to the first communication protocol.

The first part of the client is configured to send information directed to the server computer via the second part predictively prior to receiving an indication that the server computer is ready to receive said information. The second part of the client is configured to delay such predictively sent communication, if necessary, until it receives the indication that the server computer is ready to receive the information.

Passing the session initiation information may further include receiving a first message including a reference to cryptographic data from the client and sending a second message including cryptographic data corresponding to the reference to the server computer. The cryptographic data may include a cryptographic certificate. The data may be accessible to the proxy without communication over the disadvantaged link. The data may be retrieved from a third party server. The reference to the data may be determined from one or more characteristics of cryptographic data for the client computer provided by the client device to the proxy.

The first part may be implemented as an add-on to a standard TLS client. The second part may be implemented as an explicit component and the first part may be configured to use the second part. The second part may be implemented as a transparent component and the first part may be unaware of the existence of second part. The second part may be hosted one of a wireless network provide, a content caching service, or a third party. The second part may be configured to remove itself from a communication path between the first part and the server computer upon establishment of a secure communication session between the first part and the server computer.

Embodiments may have one or more of the following advantages.

Among other advantages, embodiments divide a TLS client into two components which straddle a disadvantaged link. A first component sits on the client side of the disadvantaged link and a second component is implemented as a proxy disposed on the server side of the disadvantaged link and between the first component and the server.

Embodiments optimize the establishment of a secure connection between the client and the server while maintaining backward compatibility with existing TLS servers (i.e., without requiring any modification be made to the configuration of standard TLS servers). To do so, embodiments ensure that all communications received at the standard TLS server conform to the standard TLS handshaking protocol. Moreover, embodiments can be implemented as minimal modifications of or additions to existing TLS client implementations.

Embodiments include a TLS proxy which handles only public information and does not have access to any of the client's secrets or server's secrets.

Embodiments optimize the establishment of a secure connection over a disadvantaged link between a client and a server by reducing the amount of data that is sent over the disadvantaged link and reducing the total number of round trip communications between the client and the server. For example, embodiments allow for a TLS handshake to complete using only a single round-trip communication over the disadvantaged link while sending less data (e.g., certificates) . The protocol preserves the end-to-end security guarantees of TLS between the client application and the server.

Embodiments are designed to recover gracefully from cache resets and other similar types of real-world complications.

Embodiments include optimizations which utilize TLS extensions. The use of TLS extensions ensures that whether or not the OTLS proxy is present, the client can always establish a connection with the server because the ClientHello message that the client sends to the server is guaranteed to be understandable to the server.

Other features and advantages of the invention are apparent from the following description, and from the claims.

DESCRIPTION

1 System Overview

In general, the following description relates to a protocol, referred to below as the "optimized transport layer security" or "OTLS" protocol (without intending any limitation by the nomenclature), which is used to efficiently establish a secure communication channel between a client and a server over a network which includes a disadvantaged link.

Figure 1:
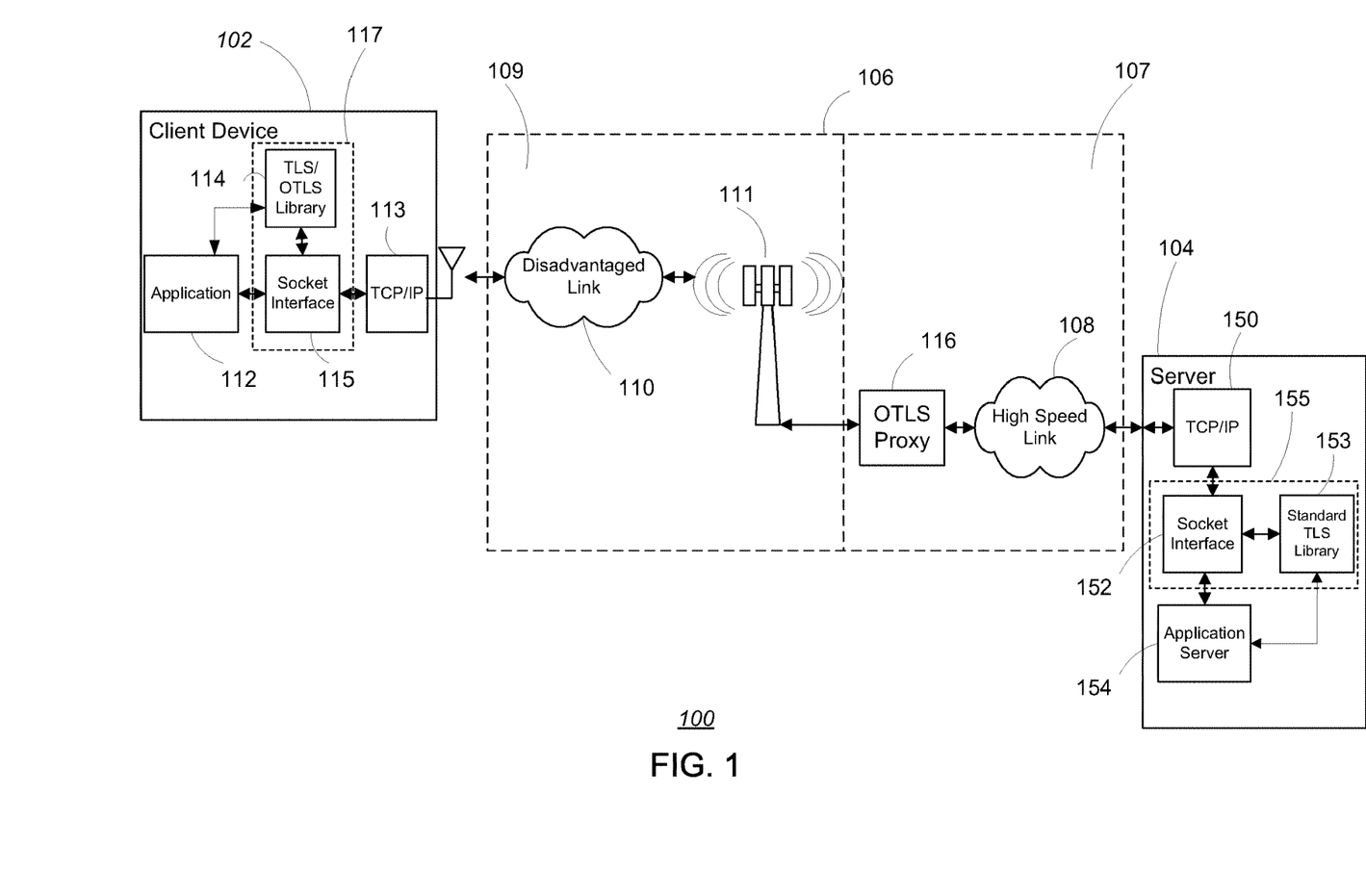
FIG. 1 is a communication system utilizing the optimized TLS protocol.

Referring to FIG. 1, a communication system 100 includes a client 102 (e.g., a client device) which communicates with a server 104 (e.g., a server computer) over communication path on a network 106. The network 106 includes terrestrial network portion 107 and a non-terrestrial network portion 109. In general, the terrestrial network portion 107 is a conventional terrestrial high speed network having high bandwidth and low latency. In some examples, the terrestrial network portion 107 has an infrastructure that includes fiber optic based network elements, coaxial cable based network elements, telephone system based network elements, and so on. The non-terrestrial network portion 110 has lower bandwidth and/or higher latency than the terrestrial network portion 108 due to its reliance on low bandwidth, high latency links that include network elements such as cellular telephone towers or satellites.

In the example of FIG. 1, the client 102 communicates with the server 104 by directly communicating with the non-terrestrial network portion 109 (e.g., using a cell phone base station 111) which in turn communicates with the terrestrial network portion 107 which directly communicates with the server 104. Due to the relatively high latency and/or low bandwidth of the non-terrestrial network portion 109, data transmitted through the non-terrestrial network portion 109 is said to travel over a "disadvantaged link" 110 between the client 102 and the cell phone base station 111. Due to the relatively low latency and/or high bandwidth of the terrestrial network portion 107, data transmitted through the terrestrial network portion 107 is said to travel over a "high speed link" 108 between the cell phone base station 111 and the server 104.

The client 102 includes an application 112 (e.g., a web browser) which wishes to securely communicate with a server application 154 running on or behind the server 104 over the network 106. In one implementation of the client 102, (e.g., under a Microsoft Windows operating system), the application 112 uses a software interface to a socket interface component 115 (e.g., Microsoft Windows Winsock), which makes use of a TCP/IP protocol stack component 113. In general, the socket interface 115 makes use of a software library that implements TLS and/or SSL functions. In this implementation, an optimized library 114 implements a combined TLS/OTLS protocol and is linked to the socket interface component (e.g., as a Secure Service Provider (SSP)). The combination of the socket interface 115 and the TLS/OTLS library 114 is referred to herein as the TLS/OTLS client 117. To efficiently establish a secure connection between the client 102 and the server 104, the client 102 makes use of the TLS/OTLS library 117. The TLS/OTLS client 117 can be implemented as a modification of an existing TLS library, as a separate component interfaced with the TLS library, or from scratch as a replacement of the TLS library.

In one implementation of the server 104, (e.g., under a Microsoft Windows operating system), the server application 154 uses a software interface to a socket interface component 152 (e.g., Microsoft Windows Winsock), which makes use of a TCP/IP protocol stack component 150. The socket interface 152 makes use of a standard TLS software library 153 that implements TLS and/or SSL functions. In this implementation, the standard TLS software library 153 is linked to the socket interface component 152 (e.g., as a Secure Service Provider (SSP)). The combined socket interface 152 and the standard TLS library 153 is referred to herein as the TLS server 155.

On the path between the client 102 and the server 104, the terrestrial network portion 107 includes an OTLS proxy 116. The TLS/OTLS client 117 and the OTLS proxy 116 straddle the disadvantaged link 110 to optimize the establishment of the secure connection over the disadvantaged link 110. It is noted that the term 'proxy' generally relates to a device or process which accepts requests for some service and passes them on to an intended server and passes responses from the service back to the requestor. A proxy may run on dedicated hardware or may be purely software. It may transform the content and/or timing of the request and responses in some way or provide some additional layer of functionality, for instance, caching or remote access.

In some examples, the TLS/OTLS client 117 and the OTLS proxy 116 optimize the establishment of the secure connection by reducing the number of communication rounds over the disadvantaged link 110 required to establish the secure channel. In some examples, the TLS/OTLS client 117 and the OTLS proxy 116 further optimize the establishment of the secure connection by reducing the amount of data (e.g., certificate data) that is transmitted over the disadvantaged link 110 when establishing the secure channel.

2 OTLS Protocol Sequence

Figure 2:
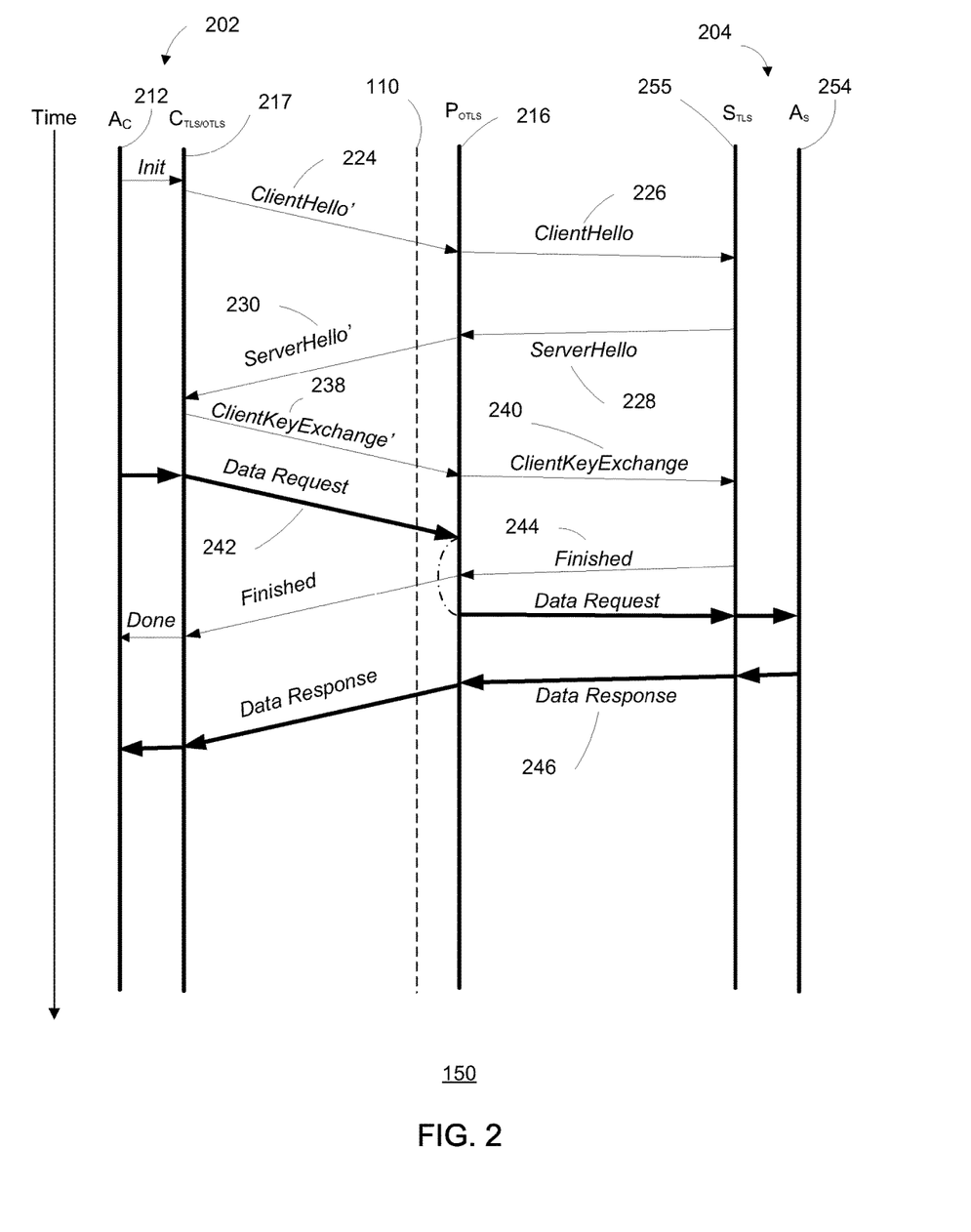
FIG. 2 is a simplified protocol sequence diagram of the optimized TLS protocol.

Referring to FIG. 2, a simplified optimized TLS protocol sequence diagram 150 illustrates an overview of the sequence of messages that are passed between the TLS/OTLS client 117 ($C_{TLS/OTLS}$), the OTLS proxy 216 ($P_{OTLS}$), and the TLS server 255 ($S_{TLS}$) to establish a secure connection between the client 202 including a client application 212 ($A_C$) and the server 204 including a server application 254 ($A_S$) over the disadvantaged link 110.

In general, the protocol optimizes the timing and size of messages which are sent over the disadvantaged link 110 to minimize the effect (e.g., time delay) of the disadvantaged link 110 on the establishment of the secure connection. To do so, the TLS/OTLS client 217 initially receives a request from the client application 212 to establish a secure communication channel with the server 204. The TLS/OTLS client 217 sends a command 224 directed to the TLS server 255 via the OTLS proxy 216 over the disadvantaged link 110 to initiate establishment of a secure connection. The command includes a non-standard ClientHello message (i.e., ClientHello') which may include optimizations such as compression of the list of ciphers and protocols supported by the TLS/OTLS client 217. Other types of optimizations, including but not limited to certificate identifiers of the server 104 and client 102, are also possible. In some examples, the optimizations are implemented using ClientHello extensions. One advantage of using ClientHello extensions to implement the optimizations described above is that, if the OTLS proxy 216 is not present, the TLS server 255 will ignore the extensions and instead use a standard TLS handshake to establish the secure channel between the client 102 and the server 104. The OTLS proxy 216 receives the non-standard ClientHello message and reverses the optimizations (e.g., decompresses the list of ciphers and protocols)

to form a standard TLS ClientHello message 226 which it sends to the TLS server 255. It is noted that the compression of the list of ciphers and protocols described above is an optional optimization which can only be used in situations where the client device 102 is aware of the presence of the OTLS proxy 216.

The TLS server 255 replies by sending a standard ServerHello message 228, a server certificate, an optional ServerKeyExchange message for ephemeral handshakes, an optional CertificateRequest message, and a ServerHelloDone message back to the TLS/OTLS client 217 via the OTLS proxy 216. The OTLS proxy 216 optimizes the standard ServerHello message 228 to form an optimized ServerHello message 230 (i.e., ServerHello') which it sends back to the TLS/OTLS client 217 over the disadvantaged link 110. In some examples, the optimizations performed by the OTLS proxy 216 include replacement of the server's certificate with a short identifier and compression of the list of ciphers and protocols supported by the TLS server 255.

The TLS/OTLS client 217 receives the optimized ServerHello message and responds by sending an optional client certificate (i.e., if client authentication is required), an optimized ClientKeyExchange message 238 (i.e., ClientKeyExchange'), a ChangeCipherSpec message, and an encrypted Finished message to the OTLS proxy 216 over the disadvantaged link 110 to indicate to the TLS server 255 that the TLS/OTLS client 217 is ready to securely communicate. In some examples, if client authentication is required the optimizations performed by the TLS/OTLS client 217 include replacement of the client's certificate with a short identifier (assuming that the client's certificate is cached by the OTLS proxy 216). The TLS/OTLS client 217 also optimistically assumes that the TLS server 255 will respond to its optimized ClientKeyExchange message with a positive result (i.e., without error). Based on this assumption, the TLS/OTLS client 217 reports to the client application 212 that the TLS handshake has completed. The client application 212 may then send an application data transfer message (e.g., a data request) 242 to its TLS/OTLS client 212, which will encrypt it and forward it to the OTLS proxy 216 immediately following the transmission of the optimized ClientKeyExchange message and before receiving a Finished message from the TLS server 255.

The OTLS proxy 216 receives the optimized ClientKeyExchange message and reverses the optimizations in the message (e.g., fills in the client's certificate) to form a standard ClientKeyExchange message 240. The OTLS proxy 216 sends the standard ClientKeyExchange message to the TLS server 255. In some examples, the OTLS proxy 216 receives the application data transfer message before the TLS server 255 has an opportunity to respond with its Finished message 244. To preserve the integrity of the standard TLS protocol executing on the TLS server 255, the OTLS proxy 216 may buffer (i.e., store) the application data transfer message until it receives the Finished message from the TLS server 255. Once the Finished message is received at the OTLS proxy 216, the proxy "knows" that the TLS server 255 has completed the TLS handshake and, hence, the OTLS proxy 216 can send the buffered application data transfer message to the TLS server 255. The TLS server 255 decrypts and passes the data transfer message to the server application 254 which may respond by providing a server application response 246 to the TLS server 255. The TLS server 255 encrypts the server application data and transits the encrypted data to the client application 212. It is noted that data transmissions communicated over the secure channel can originate from either the client or the server. In the example described above, the client is the first to send a data transmission. However, the server could just as easily have been the one to send the first data transmission.

Figure 3:
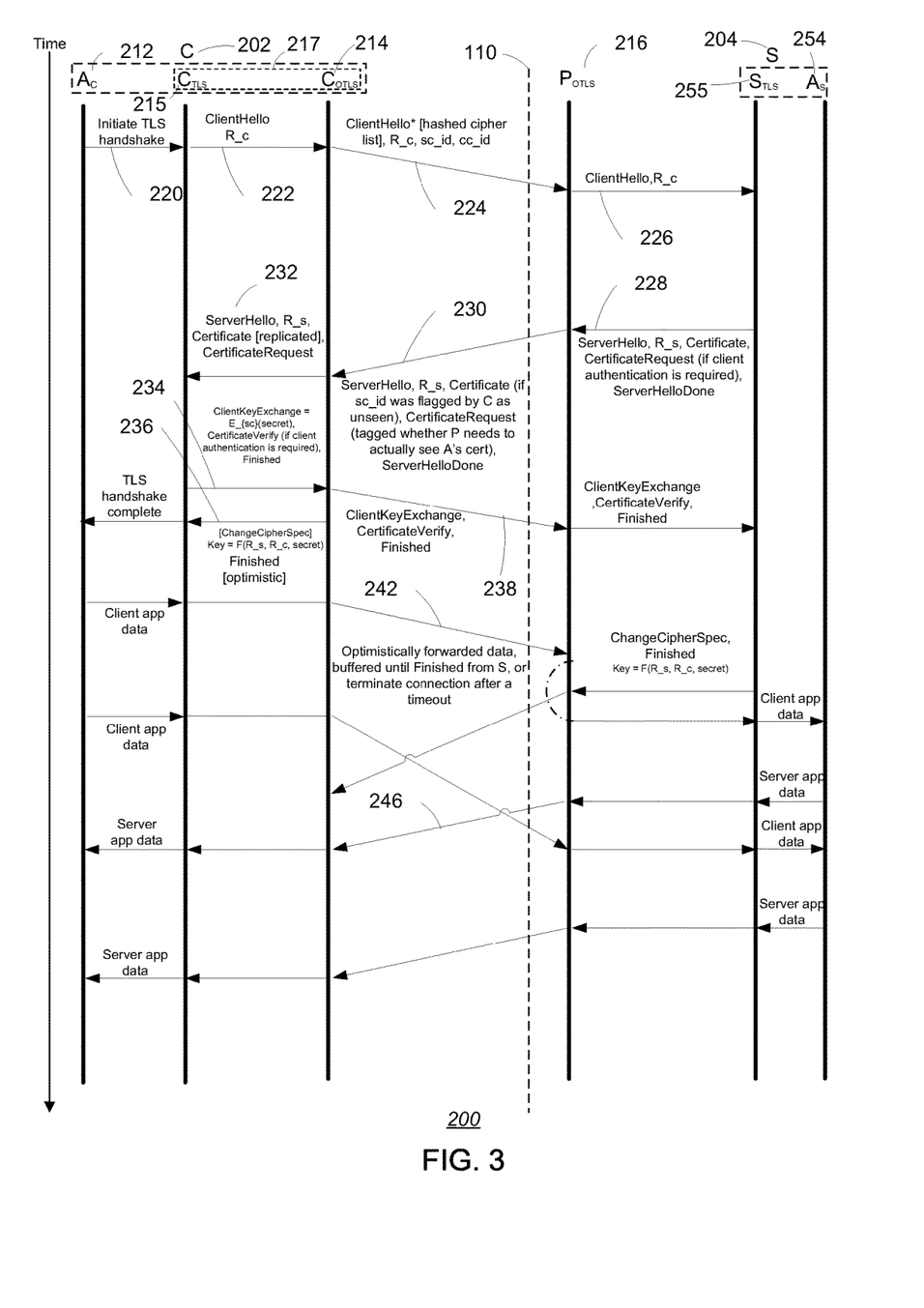
FIG. 3 is a detailed protocol sequence diagram of the optimized TLS protocol.

Referring to FIG. 3, a detailed protocol sequence diagram 200 illustrates a sequence of exchanges between the client application 212 ($A_C$), a standard TLS client 215 ($C_{TLS}$), an OTLS client 214 ($C_{OTLS}$), the OTLS proxy 216 ($P_{OTLS}$), the TLS server 255 ($S_{TLS}$), and the server application 254 ($A_S$) which is required to establish a secure connection according to the OTLS protocol. It is noted that in FIG. 3, the TLS/OTLS client 217 is represented as having two separate components, the standard TLS client 215 and the OTLS client 214. This is done for the purpose of clarity and having separate TLS and OTLS clients is not necessary or required.

In general, the OTLS protocol illustrated by the protocol sequence diagram 200 utilizes two unique components: the OTLS client 214 running on the client 202 which is on a first side of the disadvantaged link 110 and the OTLS proxy 216 which runs on a second side of the disadvantaged link 110, opposite the first side of the disadvantaged link 110 (e.g., at a cellular base station). The OTLS protocol uses the OTLS proxy 216 and the OTLS client 214 to optimize the handshake between the client 202 and the server 204 while preserving the standard TLS handshake protocol from the point of view of the standard TLS server 255. The resulting optimized handshake protocol avoids unnecessarily sending the server and client certificates over the disadvantaged link 110 and reduces the number of round trip communications between the client 202 and the server 204 to one. Furthermore, the security of standard TLS is preserved since the OTLS proxy 216 does not have access to any of the client's secrets because the client 202 performs all of the cryptographic and trust management tasks.

To establish the secure connection, the client application 212 first sends an initialization command 220 to the standard TLS client 215 to initiate a TLS handshake. Upon receiving the command from the application 212, the standard TLS client 215 forms a standard ClientHello message 222 including the standard TLS client's random number $R_c$.

The standard ClientHello message is provided to the OTLS client 214 which modifies the ClientHello message to include three additional pieces of information as TLS extensions. The first additional piece of information is a compressed version (i.e., a hash) of a standard cipher list (i.e., a list of authentication, encryption, and message authentication code (MAC) algorithms used to negotiate the security settings for a network connection). The full version of the standard cipher list is removed from the ClientHello message to reduce the message size. The second additional piece of information is an identifier (e.g., a hash value) identifying a one or more certificates for the server 204 which the OTLS client 214 has cached. In some examples, the identifier identifies a certificate for the TLS server 255 which was received and cached by the OTLS client 214 while establishing a previously successful TLS connection with the TLS server 255.

The third additional piece of information is a hash value identifying a certificate for the client that the OTLS proxy 216 may have cached (in the case that the TLS server 255 requires a certificate from the TLS/OTLS client 217). In some examples, the OTLS client 214 maintains a list of servers which require certificates from the TLS/OTLS client 217 and optionally prompts a user to confirm which client certificate (of which there may be many) the user would like to provide to the TLS server 255.

The modified ClientHello message 224 is sent across the disadvantaged link 110 and is received by the OTLS proxy 216. The OTLS proxy 216 reads the compressed version of the standard cipher list and expands it to the full list of supported protocols and ciphers. In some examples, the compressed version of the standard cipher list is a hash value and the OTLS proxy 216 maintains a database of cipher lists, each associated with a different hash value. To expand the hash value to an uncompressed standard cipher list, the OTLS proxy 216 searches the database of cipher lists to find a cipher list which has a hash value matching the hash value from the modified ClientHello message. The cipher list associated with the matching hash value is used as the uncompressed standard cipher list. The OTLS proxy 216 reconstructs the standard TLS ClientHello message 226 using the uncompressed standard cipher list and sends the standard ClientHello message along with the client random number $R_c$ to the TLS server 255.

Upon receiving the standard ClientHello message and $R_c$ from the OTLS proxy 216, the TLS server 255 formulates a standard TLS reply 228 including a ServerHello message, with the server's random number $R_s$, the server's certificate, a CertificateRequest message when client authentication is required by the TLS server 255, and a ServerHelloDone message. In some examples, an additional ServerKeyExchange message carrying either an ephemeral Rivest-Shamir-Adleman (RSA), or Diffie-Helman (DH), or Elliptic-Curve Diffie-Helman (ECDH) key agreement contribution can be sent after the CertificateRequest message and before the ServerHelloDone message. The TLS server's standard TLS reply 228 is sent to the OTLS proxy 216.

The OTLS proxy 216 receives the TLS server's standard TLS reply 228 and modifies the reply to form an optimized TLS server reply 230. In particular, the OTLS proxy 216 modifies the standard ServerHello message to replace the full list of ciphers and protocols supported by the TLS server 255 with a compressed version of the list of ciphers and protocols supported by the TLS server 255 (i.e., a hash of the list).

The OTLS proxy 216 compares the server certificate identified in the ClientHello message as being cached by the OTLS client 214 to the certificate received from the TLS server 255 to determine if they are the same certificate. If the OTLS proxy 216 determines that the TLS server certificate cached by the OTLS client 214 is the same as the certificate received from the TLS server 255, the OTLS proxy 216 does not include the server certificate in the optimized server reply and instead includes a certificate indicator (e.g., a short identifier) in the optimized server reply indicating that the OTLS client 214 can use its cached server certificate. If the OTLS proxy 216 determines that the certificate from the TLS server 255 is not cached by the OTLS client 214, the OTLS proxy 216 leaves the server certificate in the optimized server reply and includes a certificate indicator in the optimized server reply indicating that the OTLS client 214 must use the new certificate.

Finally, the OTLS proxy 216 includes the server random number $R_s$, CertificateRequest, and ServerHelloDone messages from the TLS server's standard TLS reply in the optimized server reply 230. In some examples, the OTLS proxy 216 also performs efficient coding on the TLS server's reply to, for example, reduce the size of the reply. In the case that the TLS server 255 requires client authentication, the OTLS proxy 216 can confirm to the OTLS client 214 whether or not it has the client certificate cached or can retrieve it from a certificate server identified in the ClientHello message. This optimization can obviate the need for the OTLS client 214 to send its certificate. The optimized server reply is sent over the disadvantaged link 110 to the OTLS client 214.

When the OTLS client 214 receives the optimized TLS server reply from the OTLS proxy 216, the OTLS client 214 reconstructs a standard TLS server response 232 from the optimized TLS server reply. To do so, the OTLS client 214 reads the hashed list of ciphers and protocols supported by the TLS server 255 from the ServerHello message of the optimized server reply and decompresses the hashed list into a full list of ciphers and protocols. In some examples, the compressed version of the standard cipher list is a hash value and the OTLS client 214 maintains a database of cipher lists, each associated with a hash value. To expand the hash value from the ServerHello message to an uncompressed standard cipher list, the OTLS client 214 searches the database of cipher lists to find a cipher list which has a hash value matching the hash value and uses the cipher list associated with the matching hash value as the uncompressed standard cipher list.

The OTLS client 214 also reads the certificate indicator from the optimized server reply to determine whether to include a server certificate from the optimized server reply (if one is present) or to use the server certificate, indicated in the ClientHello message, from its cache of server certificates in the standard TLS server response.

The standard TLS server response reconstructed by the OTLS client 214, including the reconstructed ServerHello message, the server random number $R_s$, the (possibly) reconstructed server certificate, and the CertificateRequest message is then sent to the standard TLS client 215. While the OTLS proxy 216 and the OTLS client 214 performed a number of optimizations on the response from the TLS server 255, the TLS server response received by the standard TLS client 215 is no different than a response received directly from the TLS server 255 during a standard TLS handshake. It is noted that it is not required that the TLS server response received by TLS client 215 is no different than a response received directly from the server 204 during a standard TLS handshake. In some examples, the TLS client 215 is modified such that it is capable of handling non-standard TLS server responses.

Upon receiving the standard TLS server response, the standard TLS client 215 sends a standard TLS client response 234 including a ClientKeyExchange message, a CertificateVerify message, and a Finished message back to the OTLS client 214. In general, the ClientKeyExchange message includes a premaster secret s (unknown to the OTLS proxy 216) which is encrypted with the server's public key (obtained from the server's certificate). The CertificateVerify message includes the TLS client's digital signature of all of the handshake messages that it has received and is only included in the standard TLS client response if the TLS server 255 requires client authentication.

In the case that client authentication is required, if the OTLS client 214 has learned from the OTLS proxy 216 during the ServerHello step that the OTLS proxy 216 has the client's certificate cached (or can retrieve the client's certificate from a certificate server accessible over the terrestrial network), the OTLS client 214 replaces the TLS client certificate with a short identifier of the cached certificate. The OTLS client 214 sends the modified TLS client response to the OTLS proxy 216. If applicable, the OTLS proxy 216 replaces the certificate identifier with the appropriate cached TLS client certificate and sends the TLS client response to the TLS server 255. At the same time, the OTLS client 214 computes a session key in accordance with the TLS standard using the client random number $R_c$, the server random number $R_s$, and the premaster secret s. An optimistic server reply 236 including the session key, a CipherSpec message, and an optimistic Finished message are immediately sent from the OTLS client 214 to the standard TLS client 215 which then indicates to the application 212 that the TLS handshake is complete and that a TLS connection is successfully established. It is noted that the Finished message is optimistic in that the OTLS client 214 does not wait for the TLS server 255 to respond to the standard TLS client response before notifying the standard TLS client 215 and the application 212 that the TLS handshake is complete.

In the example of FIG. 3, with the TLS handshake complete, the application 212 provides unencrypted application data (e.g., a data request) to the standard TLS client 215 which encrypts the client data using the session key and sends the encrypted data to the OTLS client 214, then to the OTLS proxy 216 over the disadvantaged link 110 and to the TLS server 255. Since the client application 212 sends the data to the TLS server 255 before receiving a Finished message from the TLS server 255, there is a chance that the encrypted data could reach the TLS server 255 before the TLS server 255 is finished with its TLS handshaking protocol. Such a violation of the TLS server's TLS handshaking protocol is at best unconventional and at worst can cause malfunctions in the establishment of the secure connection.

To avoid such a violation, the OTLS proxy 216 can intercept the encrypted data before it reaches the TLS server 255 and buffer the encrypted data until the OTLS proxy 216 receives the ChangeCipherSpec and Finished messages from the TLS server 255. Upon receiving the ChangeCipherSpec and Finished messages from the TLS server 255, the OTLS proxy 216 sends the buffered encrypted data to the TLS server 255. The TLS server 255 receives the encrypted data, decrypts the data and forwards the decrypted data to the server application 254. The server application 254 may reply with its own message. In this case, the reply message from the server application 254 is encrypted by the TLS server 255 and is sent to the client 202 via the OTLS proxy 216. Transmission of encrypted data between the client 202 and the server 204 continues in this manner according to the application design until the secure connection is terminated.

In parallel to the encrypted data transmission, the OTLS proxy 216 also provides the server's ChangeCipherSpec and Finished messages to the OTLS client 214 which verifies the cryptographic hash sent by the TLS server 255. If an error is detected the OTLS client 214 terminates the secure connection.

In some examples, once the OTLS handshake is complete, the OTLS client 214 and the OTLS proxy 216 are eliminated from the transmission path of the data (i.e., the TLS server 255 and the TLS client 215 are directly connected by a single TCP connection). For example, after the OTLS handshake is complete, the OTLS proxy 216 can communicate with the OTLS client 214 to inform the OTLS client 214 how to adjust its TCP state to be synchronized with the server's view of the TCP connection. The OTLS proxy 216 and the OTLS client 214 can then step out of the way and let the TCP connection from the client 202 to the server 204 proceed unmanaged.

In other examples, the OTLS client 214 and the OTLS proxy 216 remain in the transmission path of the encrypted data but are transparent (i.e., an intercepting proxy) from the point of view of the TCP connection between the client 202 and the server 204. To remain transparent, the OTLS client 214 and the OTLS proxy 216 intercept and possibly modify messages exchanged by the client 202 and the server 204. For example, the OTLS client 214 and the OTLS proxy 216 may perform message re-writing to ensure TCP-level continuity between the client 202 and the server 204 (e.g., to ensure that messages appear unmodified and uncorrupted from the point of view of the server 204 and the client 202).

In some examples, the OTLS client 214 and the OTLS proxy 216 can be seen as an explicit proxy which is configured in, for example, the client's web-browser or as part of the client's network configuration. In such a case, two TCP connections exist: the connection between the OTLS client 214 and the OTLS proxy 216, and the connection between the OTLS proxy 216 and the TLS server 255. In this case, the OTLS client 214 and the OTLS proxy 216 are co-designed to implement OTLS, but only the OTLS client 214 is privy to secret information (e.g., the session key). From the TLS server's point of view, the connection from the OTLS proxy 216 to the TLS server 255 appears as if a standard TLS is at the same location as the OTLS proxy 216 (on a fast link).

In some examples, if the OTLS proxy 216 or OTLS client 214 does not receive the ChangeCipherSpec and Finished messages from the TLS server 255 within a predetermined timeout period, the connection between the TLS server 255 and the TLS client 215 is terminated and error codes are issued.

In some examples, the optimized protocol described above is highly resilient and is capable of gracefully recovering from cache resets and other similar types of real-world complications. In some examples, the use of TLS extensions to implement the modified ClientHello message allows the protocol to fall back onto a standard TLS implementation if the OTLS proxy 216 is not present. For example, during the first client-server handshake round, the OTLS client 214 and the OTLS proxy 216 efficiently synchronize on whether they have the right server and client certificates in their caches to allow for these certificates to be removed from the exchanges. If a connection is unsuccessful due to an unlikely cache reset during the handshake itself, the connection attempt will be repeated and will result in the standard TLS handshake; which will also cache the certificates for later use. Furthermore, it is possible to negotiate a standard TLS connection if the OTLS connection attempt does not succeed. In some examples, connection failure events are monitored at the client and OTLS can be disabled for particular server connections based on the monitoring.

3 Alternatives

In some examples, the OTLS client 214 and the OTLS proxy 216 are co-designed and therefore can efficiently encode the information exchanged between them as long as the encoding allows them to reconstruct the standard TLS messages for the TLS client and the TLS servers, respectively. In some examples, the approaches described above are implemented using OpenSSL or some other modifiable SSL or TLS implementation.

Note that the approaches described above are not tied to any particular operating system or software environment for the client device, including but not limited to Microsoft Windows, Linux, Mac OS X, iOS, Android, etc. Furthermore, the client device may take various forms, including but not limited to a fixed or mobile (e.g., laptop) personal computers, communication devices (e.g., cellular "smartphones"), or other devices (e.g., e-book readers, media players, etc.) that make use of cellular, satellite, or other wireless communication infrastructures. In general, all such types of devices should be considered "computers".

In some implementations, the OTLS proxy is implemented in a content and application delivery server. In such implementations, the communication between the content and application delivery server and the application server may use standard TLS/SSL, or alternatively, this link may be optimized using similar or other techniques to OTLS. In some implementations, the OTLS proxy is implemented in proximity to the application server. In some such cases, the OTLS proxy is implemented at a device that provides a gateway to the Internet of the application server. In other such cases, the OTLS proxy is implemented as a software component that is hosted in the same software environment as the server application.

Although described in the context of TLS and SSL, it should also be understood that other similar existing (e.g., Datagram Transport Layer Security (DTLS)) or future security protocols may be optimized using the approaches described above.

While the example presented above includes optimizations in the ClientHello message, in some examples, no optimizations are present and a standard ClientHello message is used.

In the example presented above, certain messages such as the ClientKeyExchange message are transmitted only after a first response from the server is received at the client. However, in some examples, these messages (e.g., ClientKeyExchange, ChangeCipherSpec) can be sent from the client to the server immediately following the ClientHello message. This is possible since the client knows the server's certificate (or at least knows what the last certificate it used to communicate with the server was). The proxy can intercept the messages and delay sending them to the server until an appropriate time, as determined by the handshaking protocol being used. In general, ClientKeyExchange messages are large so there may be some advantages in sending ClientKeyExchange messages earlier on in the handshaking protocol.

In the example presented above, the TLS/OTLS client 217 includes both a standard TLS client 215 and an OTLS client 216. However, this is just one implementation of OTLS which leverages an existing TLS client. In other examples, the OTLS client is a single component, running under the application, which could either be developed from scratch, as a modified standard TLS client, or as a hybrid of a standard TLS client and an optimized version of the TLS client. That is, no standard TLS client is required.

In general, the exchange of messages between the application and the application server can be arbitrary. In the example presented above, it is assumed that the application first sends a message after the TLS channel is established that the application server replies right away. However, in some examples, the server is the first one to send a TLS-encrypted message over the TLS connection.

In some examples, multiple clients, proxies and servers are included in a larger communication system. The OTLS protocol is capable of functioning in these larger communication systems.

While the above examples describe the TLS server as being an integral part of the server 204, in some examples, the TLS server is implemented as a separate entity (e.g., as a TLS appliance) in front of the server 204. In some examples, the TLS server is a physically separate entity from the server 204 and may be remotely located.

4 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method for establishing a secure communication session over a communication path between a client device and a server device according to a communication protocol, the method comprising:

storing session initiation information associated with the client device at an intermediate device located on the communication path between the client device and the server device;

sending, in a session initiation phase, a first message from the client device for establishing the secure communication session between the client device and the server device, the first message including a reference to the session initiation information;

receiving and processing, in the session initiation phase, the first message at a first communication interface implemented on the intermediate device, the processing including forming a second message for establishing the secure communication session including replacing the reference to the session initiation information in the first message with the stored session initiation information such that the second message conforms to the communication protocol;

sending, in the session initiation phase, the second message from the first communication interface to the server device over the communication path;

establishing, in the session initiation phase, the secure communication session using the second message received at the server device; and passing, in a data communication phase following the session initiation phase, data messages between the client device and the server device in the secure communication session, wherein the intermediate device does not have access to content of the data messages,
wherein a first portion of the communication path between the client device and the intermediate device is associated with a high latency and/or a low bandwidth relative to a second portion of the communication path between the intermediate device and the server device.

2. The method of claim 1 wherein the processing includes using the reference to the session initiation information to retrieve the session initiation information stored at the intermediate device, and wherein the session initiation information in the first message is replaced with the retrieved session initiation information.

3. A method for establishing a secure communication session over a communication path between a client device and a server device according to a communication protocol, the method comprising:
storing session initiation information associated with the server device at a second communication interface located on the communication path between the client device and the server device;
sending, in a session initiation phase, a first message from the server device for establishing the secure communication session between the client device and the server device, the first message including session initiation information;
receiving and processing, in the session initiation phase, the first message at a first communication interface implemented on an intermediate device located on the communication path, the processing including forming a second message for establishing the secure communication session including replacing the session initiation information with a reference to the session initiation information;
sending, in the session initiation phase, the second message from the first communication interface over the communication path;
receiving and processing, in the session initiation phase, the second message at a second communication interface on the communication path between the client device and the server device, the processing including forming a third message for establishing the secure communication session including replacing the reference to the session initiation information with the session initiation information stored at the second communication interface such that the third message conforms to the communication protocol;
sending, in the session initiation phase, the third message from the second communication interface to the client device over the communication path;
establishing, in the session initiation phase, the secure communication session using the third message received at the client device; and
passing, in a data communication phase following the session initiation phase, data messages between the client device and the server device in the secure communication session, wherein the intermediate device and the second communication interface do not have access to the content of the data messages,
wherein a first portion of the communication path between the intermediate device and the client device is associated with a high latency and/or a low bandwidth relative to a second portion of the communication path between the intermediate device and the server device.

4. A method for establishing a secure communication session over a communication path between a first process executing on a first device and a second process executing on a second device according to a communication protocol, the method comprising:
storing session initiation information associated with the first process with an intermediate communication interface located on the communication path between the first process and the second process;
receiving, in a session initiation phase, at the intermediate communication interface, a first message for establishing the secure communication session between the first process and the second process, the first message including a reference to the stored session initiation information;
processing, in the session initiation phase, the first message received at the intermediate communication interface including,
forming a second message for establishing the secure communication session including replacing the reference to the stored session information in the first message with the stored session initiation information such that the second message conforms to the communication protocol, and
sending the second message to the second process, the second message received at the second process causing, in the session initiation phase, establishment of the secure communication session;
wherein, in a data communication phase following the session initiation phase, data messages pass between the second process and the first process in the secure communication session and the intermediate communication interface does not have access to content of the data messages, and
the communication path has a first portion between the first process and the intermediate communication interface associated with a high latency and/or a low bandwidth relative to a second portion of the communication path between the intermediate communication interface and the second process.

5. The method of claim 4 further comprising establishing the secure communication session using the received second message at the second process.

6. The method of claim 4 wherein the first device is a client device, the second device is a server device, and the intermediate communication interface is implemented as an application executing on the server device.

7. The method of claim 4 wherein the first device is a server device, the second device is a client device, and the intermediate communication interface is implemented as an application executing on the client device.

8. The method of claim 4 further comprising receiving and storing, at the intermediate communication interface, the first information from the first process prior to receiving the first message at the intermediate communication interface.

9. The method of claim 8 wherein the first information includes one or more of a list of ciphers supported by the first process, a list of protocols supported by the first process, and cryptographic information associated with the first process.

10. The method of claim 8 wherein
the first message includes a reference to cryptographic information associated with the first process, and
the first information includes the cryptographic information associated with the first process,
wherein determining the first information from the first message includes determining the cryptographic information associated with the first process based on the reference to the cryptographic information associated with the first process.

11. The method of claim 10 wherein the cryptographic information includes a cryptographic certificate.

12. The method of claim 4 further comprising
receiving, at a second communication interface, from the first process, a third message conforming to the communication protocol,
forming, at the second communication interface, the first message based on the third message, and
sending the first message from the second communication interface to the intermediate communication interface.

13. The method of claim 12 wherein
the third message includes an indication that the first process is prepared to complete establishment of the secure communication session pending reception of a fourth message indicating that the second process is prepared to complete establishment of the secure communication session at the first process,
the method further comprising, in the session initiation phase, sending, from the second communication interface, a fifth message indicating that the second process is prepared to complete establishment of the secure communication session to the first process prior the first process receiving the fourth message.

14. The method of claim 13 wherein passing data messages between the second process and the first process in the secure communication session includes passing at least some data messages between the first process and the second process prior to the first process receiving the fourth message.

15. The method of claim 12 wherein the second communication interface is implemented as an application executing on the first device.

16. The method of claim 12 wherein the second communication interface is implemented as an application executing on an intermediate device on the communication path.

17. The method of claim 4 wherein determining the first information from the first message includes decompressing at least a part of the first message.

18. The method of claim 4 wherein communication protocol comprises a Transport Layer Security (TLS) protocol.

19. The method of claim 4 wherein the data messages are passed via the intermediate communication interface in the secure communication session.

20. The method of claim 4 wherein the intermediate communication interface is implemented as an application executing on an intermediate device on the communication path.

* * * * *